United States Patent
Seagrave et al.

(10) Patent No.: US 9,841,866 B1
(45) Date of Patent: Dec. 12, 2017

(54) FACILITATING INTERACTIONS BETWEEN CHILDREN AND EXPERTS

(75) Inventors: Jodell Seagrave, Redwood City, CA (US); Steve Snyder, San Francisco, CA (US); Allen Goldblatt, San Francisco, CA (US); Marshall Raskind, Bainbridge Island, WA (US); Bob Day, Seattle, WA (US); Lisa Litsey, San Francisco, CA (US); Mark W. Grayson, Fairfield, CT (US)

(73) Assignee: Rocket21 Enterprises, LLC., Springfield, MO (US)

( * ) Notice: Subject to any disclaimer, the term of this patent is extended or adjusted under 35 U.S.C. 154(b) by 164 days.

(21) Appl. No.: 13/403,745

(22) Filed: Feb. 23, 2012

Related U.S. Application Data

(60) Provisional application No. 61/446,018, filed on Feb. 23, 2011.

(51) Int. Cl.
   *G06F 3/00* (2006.01)
   *G06F 3/0481* (2013.01)
   *G06F 9/44* (2006.01)
   *G06F 17/30* (2006.01)

(52) U.S. Cl.
   CPC .......... *G06F 3/0481* (2013.01); *G06F 9/4443* (2013.01); *G06F 17/30* (2013.01)

(58) Field of Classification Search
   CPC ... H04L 29/0809; H04L 12/1822; H04L 9/00; G06F 21/31; G06F 21/36; G06F 9/4443; G06F 8/38; G06F 1/163; G06F 3/011; G06F 17/30; G06F 9/44; G06Q 10/10
   USPC ............ 715/757, 741, 751, 744, 866
   See application file for complete search history.

(56) References Cited

U.S. PATENT DOCUMENTS

| | | | |
|---|---|---|---|
| 6,205,472 B1 | 3/2001 | Gilmour | 709/206 |
| 6,377,949 B1 | 4/2002 | Gilmour | 707/10 |
| 6,640,229 B1 | 10/2003 | Gilmour et al. | 707/9 |
| 7,043,698 B2 | 5/2006 | Newbold | 715/789 |
| 7,698,255 B2 | 4/2010 | Goodwin et al. | 707/3 |
| 7,698,303 B2 | 4/2010 | Goodwin et al. | 707/200 |
| 8,219,542 B2 * | 7/2012 | Niejadlik | 707/709 |
| 2005/0227216 A1 * | 10/2005 | Gupta | 434/322 |
| 2006/0053379 A1 * | 3/2006 | Henderson | G06F 3/0481 715/751 |
| 2006/0168186 A1 * | 7/2006 | Mathew et al. | 709/223 |
| 2006/0168544 A1 | 7/2006 | Zaner et al. | 715/836 |
| 2008/0065386 A1 * | 3/2008 | Cross | G06F 9/4443 704/270 |
| 2008/0125148 A1 | 5/2008 | Zhao et al. | 455/466 |
| 2008/0281622 A1 | 11/2008 | Hoal | 705/1 |
| 2009/0044113 A1 | 2/2009 | Jones et al. | 715/707 |
| 2009/0063991 A1 | 3/2009 | Baron et al. | 715/751 |
| 2009/0106080 A1 | 4/2009 | Carrier et al. | 705/10 |
| 2009/0150947 A1 * | 6/2009 | Soderstrom | 725/93 |
| 2009/0291426 A1 * | 11/2009 | Polivka | 434/350 |
| 2009/0317786 A1 * | 12/2009 | Alcorn et al. | 434/323 |

(Continued)

*Primary Examiner* — Joy M Weber
(74) *Attorney, Agent, or Firm* — Sheppard Mullin Richter & Hampton LLP

(57) ABSTRACT

A virtual environment may be provided to facilitate education and knowledge gathering by users. The users may include children, youth, and/or other users. The users may be enabled to form connections between themselves and/or experts, and to communicate between themselves and/or with experts. Users may be provided with a different interface than experts.

20 Claims, 6 Drawing Sheets

(56) References Cited

U.S. PATENT DOCUMENTS

| | | | |
|---|---|---|---|
| 2010/0070584 A1* | 3/2010 | Chen | G06Q 10/107 709/206 |
| 2010/0100809 A1* | 4/2010 | Thomas | H04Q 3/0062 715/235 |
| 2010/0120011 A1* | 5/2010 | O'Brien | 434/362 |
| 2010/0169798 A1 | 7/2010 | Hyndman et al. | 715/757 |
| 2010/0250578 A1 | 9/2010 | Athsani et al. | 707/765 |
| 2010/0250643 A1 | 9/2010 | Savage et al. | 709/202 |
| 2010/0262923 A1* | 10/2010 | Citrin | G06F 3/0482 715/752 |
| 2011/0191417 A1* | 8/2011 | Rathod | G06Q 30/02 709/204 |

* cited by examiner

FACILITATING INTERACTIONS BETWEEN CHILDREN AND EXPERTS

RELATED APPLICATIONS

This application claims priority to U.S. Provisional Patent Application Ser. No. 61/446,018 filed Feb. 23, 2011, and entitled "SYSTEM AND METHOD FOR FACILITATING INTERACTIONS BETWEEN CHILDREN AND EXPERTS", which is incorporated herein by reference in its entirety.

FIELD OF THE INVENTION

The invention relates to a system and method for providing a virtual environment that facilitates education and knowledge gathering by users. In particular, interactions of users that are children or youth are facilitated with adult experts having specific areas of expertise, thereby providing enhanced access to information for the users.

BACKGROUND

Virtual environments, such as social networking sites, micro-blogging services, virtual worlds or spaces, forums, list serves, chat forums, and/or other virtual environments are known. Generally, these environments tend to be configured either for use by children and/or youths, or for use by adults. Aside from the content provided in such virtual environments, the privacy, modes of communication, registration processes, and/or other aspects of the virtual environments may be tailored for one of these two groups. As such, a virtual environment in which children and/or youths can engage adults unknown to them in the real world for the purpose of learning, receiving counsel, and/or networking may not exist.

SUMMARY

One aspect of this disclosure relates to a system and/or a method of providing a virtual environment that facilitates education and knowledge gathering by users. The users may include children (<13 years of age), youth (<years of age), and/or other users. Interactions between the users and experts having field-specific expertise. The users may be able to form connections between themselves and/or experts, and to communicate between themselves and/or with experts. Users may be provided with a different interface than experts to enhance, for example, usability for the users and/or the experts. The users may be represented differently from the experts within the virtual environment, as experts may be presented in a formal fashion and/or in a manner than accentuates their area of expertise. Areas of interest, and/or affinities thereto may be managed for the individual users. The areas of interest and/or affinities thereto may be implemented to push information to the users in which the users are more likely to be interested in. The virtual environment provided may include features of one or more of a social networking website, a virtual world, a blogging website, a micro-blogging service, and/or other features of virtual environments.

In some implementations, a system configured to provide the virtual environment may be implemented in a client/server architecture to enable users to access the virtual environment through client computing platforms in communication with one or more servers. The one or more servers may be configured to execute The computer program modules may include one or more of an expert account module, a user account module, an expert interface module, a user interface module, a connection module, an expertise space module, an interest space module, a catalogue module, an interest map module, a poll module, a concierge module, and/or other modules.

The expert account module may be configured to manage expert accounts that correspond to individual experts that use the system. The expert accounts may include expert information pertaining to the corresponding experts. Some or all of the expert information may be stored to electronic storage that is accessible to and/or associated with the one or more servers.

The user account module may be configured to manage user accounts that correspond to individual users of the system. The user accounts may include user information pertaining to the corresponding users. Some or all of the user information may be stored to electronic storage that is accessible to and/or associated with the server.

The expert interface module may be configured to provide an interface to the experts. The interface may include one or more of a web page hosted by the server, an interface provided via a dedicated client application on the client computing platforms, and/or other interfaces by which experts can receive from and/or provide information to the server. Generally, the system may operate to provide a platform by which an expert can communicate with users of the system. The system may facilitate communication between experts. Communications between a given expert, and one or more users and/or one or more other experts may include one-to-one communication, group communication, one-to-many communication, private communications, public communications, and/or other communication. The expert interface provided by expert the interface module may be configured to present such communications to the experts, and to facilitate management of communication by the experts.

By way of non-limiting example, the expert interface provided to a given expert may enable the given expert to communicate with others in the virtual environment through features common in private messaging systems. For example, the interface may organize communications within one or more mailboxes. Composition of a new message may be accomplished by presenting fields to the given expert for entry and/or selection of one or more of at least one recipient, content, a subject, and/or other information included in the communication. The expert interface may include a field configured to receive entry and/or selection from the expert for transmission of the communication to the appropriate recipients. The expert interface facilitating such communications by the expert may be configured with features similar to or the same as known email interfaces. This may enhance the ease of use for experts familiar with communicating through media such as email.

As an example, the expert interface provided to a given expert may facilitate one-to-many communications through a blogging interface configured to facilitate creation and management of a blog by the given expert. This portion of the expert interface may include one or more features in common with known blog creation tools. This may enhance the ease of use for experts familiar with maintaining a blog.

As an example, the expert interface module may be configured such that the expert interface provided to a given expert may include a profile management interface configured to receive entry and/or selection of profile information related to the given expert. The profile information may include one or more of area(s) of expertise, credential information, experience information, content (e.g., images, video, audio, text, and/or other content) and/or other information.

The expert interface module may be configured to provide "external" interfaces that represent experts within the virtual environment to other experts and/or users. In some implementations, an expert external interface representing a given expert may include one or more of a name (e.g., first and last name, legal name, and/or other real world names), area(s) of expertise, content associated with the given expert (e.g., image(s), video, audio, text, and/or other content), and/or other information. The expert external interface for the given expert may include a mechanism for contacting the given expert, access to a blog or other content managed or associated with the given expert, a field for receiving entry and/or selection of a request to form a link with the given expert, and/or other information or functionality. The expert external interface may be configured to appear as a business card having one or two sides.

The user interface may be configured to provide an interface to the users. Generally, the system may operate to provide a platform by which a user can accomplish one or more of connect with and/or communicate with experts, connect with and/or communicate with other users, express themselves, be introduced to previously undiscovered area(s) of interest, research area(s) of interest, and/or other tasks. To these and/or other ends, the user interface corresponding to a given user may provide with mechanisms by which these objectives may be accomplished.

In some implementations, the user interface may include some or all of the features commonly associated with a user's wall on a social networking web site. These may include, for example, one or more of posts by other users; status updates by the given user; links to content; users; or experts by the given user; status updates from other users (e.g., friends), experts (e.g., linked experts), and/or groups joined by the given user; links to content forwarded from other users (e.g., friends), experts (e.g., linked experts), and/or groups joined by the given user; comments on posts of text and/or content by the given user, other users (e.g., friends), and/or experts (e.g., linked experts); profile information; area(s) of interest; and/or other information.

Communications between a user and an expert may be presented to the user and the expert differently. This may be due in part to the differences between the expert interface provided by the expert interface module and the user interface provided by the user interface module. As has been set forth, communications may be presented to the expert in the format of a known email interface as separate messages, and/or message threads. Communications may be presented to the user in the format of a known social networking website. For example, the communications may be presented to the user in a feed of the user interface that includes the communications and some or all of the other types of information listed above. This may provide adult experts with a communication experience they are familiar and comfortable with, and may provide child or youth users with a communication experience that mimics the more immersive social network format. This may enhance usability for one or both groups.

The connection module may be configured to manage connections between users and/or experts. Generally, in conventional social networking web sites, these connections may be referred to as "friends". Acceptance of a connection by a first user for a second user may provide access for the second user to various information included in the user interface for the first user, may result in information entered to the system by the second user appearing on the user interface for the first user (e.g., in the feed of the first user), may enable the first user to post information and/or content to the user interface for the second user, and/or may have other results. These results may be reciprocal between the second user and the first user as well. The connection module may be configured manage the permissions for these and/or other functions within the system based on accepted connections between users and/or experts. The connection module may be configured to present to users and/or experts fields in user interfaces configured to receive selection or entry of connection requests, acceptance of connection requests, denial of connections requests, and/or other functionality related to connections.

The connection module may be configured such that the connections between users and/or experts include two or more separate types of connections. These types of connections may include a first type of connection between a user and an expert, a second type of connection between two users, and/or other types of connections. The first type of connection may be referred to herein as a "link" between the user and the expert. The second type of connection may be referred to herein as a "friend" connection between the two users. In some implementations, the connection module is configured such that a friend connection can be initiated (e.g., with a request) by either of the two users. The connection module may be configured such that a link connection can only be initiated by the user (e.g., with a request), and not by the expert. A friend connection and/or an expert connection may be ended by either party involved (e.g., whether friend or expert).

The connection module may be configured such that the formation of friend connections differs from the formation of friend connections in conventional connections in social networking web sites in one or more of a variety of manners. For example, users may not be aware of the real world names of each other. At least they may not be informed of the real world identities of other users. As such, the friend connection information for a given user (e.g., with whom the given user is connected as a friend) may not be provided to other users or experts. Not even those users or experts with which the user is connected as a friend. One or both of these features may reduce the emphasis on users connecting with real world and/or common friends. One or both of these features may enhance friend connections being spontaneously established between users that have common interests and/or usage patterns.

The expertise space module may be configured to provide spaces within the virtual environment devoted to individual areas of expertise of the experts. An area of expertise may include a broad category of expertise. An area of expertise may include a plurality of sub-categories. The sub-categories may include topical sub-categories, sets of occupations, and/or other sub-categories. By way of non-limiting example, an area of interest may include technology and engineering. The sub-categories of such an area of interest may include one or more of scuba diver, architect, auto mechanic, cybercrime product manager, energy investment specialist, information technology worker, and/or other sub-categories. The sub-categories within an individual area of expertise may be included one or more other areas of interest as well. For example, the sub-category "architect" could also be included within an art and design area of interest.

The accounts managed by expert account module 16 may include assignments of individual experts to sub-categories. These assignments may be created by the experts themselves (e.g., through input), by an administrator, and/or determined automatically based on expert profile information.

The catalogue module may be configured to catalogue and/or rank areas of interest for individual users. This may include providing a user interface whereby individual users can select areas of interest for inclusion in their catalogue. The user interface may be configured to receive selections from users indicating a hierarchy of preference and/or priority for areas of interest. The inclusion of areas interest in a catalogue of a given user, and/or the ranking of the areas of interest by the given user may provide information usable by the system to push content, information, other users, experts, and/or other features or functions to the given user. The catalogue provided by the catalogue module 30 the given user may provide the given user with a forum to discover, explore, and/or prioritize her interests.

The interest map module may be configured to generate interest maps that graphically represent the interests of users. The interest map generated for a given user may be presented to the given user, included in the user interface corresponding to the given user (e.g., on the wall of the given user), and/or presented via other media. The interest maps may provide the users with a snapshot of their current interests, passions, plans and dreams. The interest maps of the user may evolve over time as the interests of the users change and evolve. In order to generate the interest maps, information may be obtained about the subjective importance or interest of individual areas of interest to the users. Such information may be obtained by presenting a user interface to the users that request entry of subjective importance of individual areas of interest, from rankings of areas of interest in the catalogues maintained by the catalogue module, based on usage patterns of the users (e.g., time spent in area of interest and/or area of expertise spaces, amount of communication with experts, amount of communication with other users, and/or other usage parameters), and/or from other sources.

The poll module may be configured to present polls to users in the virtual environment. The polls may include one or more questions. Poll questions may be designed to expose users to different areas of interest, expertise and/or occupations, to get users to view areas of interest, expertise, and/or occupations in a different way, to learn about the individual users, and/or for other purposes.

The concierge module may be configured to push content, network links, experts, blogs, blog posts, and/or other information to users. The concierge module may provide the information to the users in the feed of their user interfaces (e.g., the feed of the users' walls). The information pushed to a given user may be determined by the concierge module based on the areas of interest included in the catalogue for the given user, the ranking of the areas of interest in the catalogue by the given user, the subjective importance of areas of interest in the interest map of the given user, the friend and/or link connections of the given user, groups the given user has joined, answers to poll questions, and/or other parameters of user usage and/or interest.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
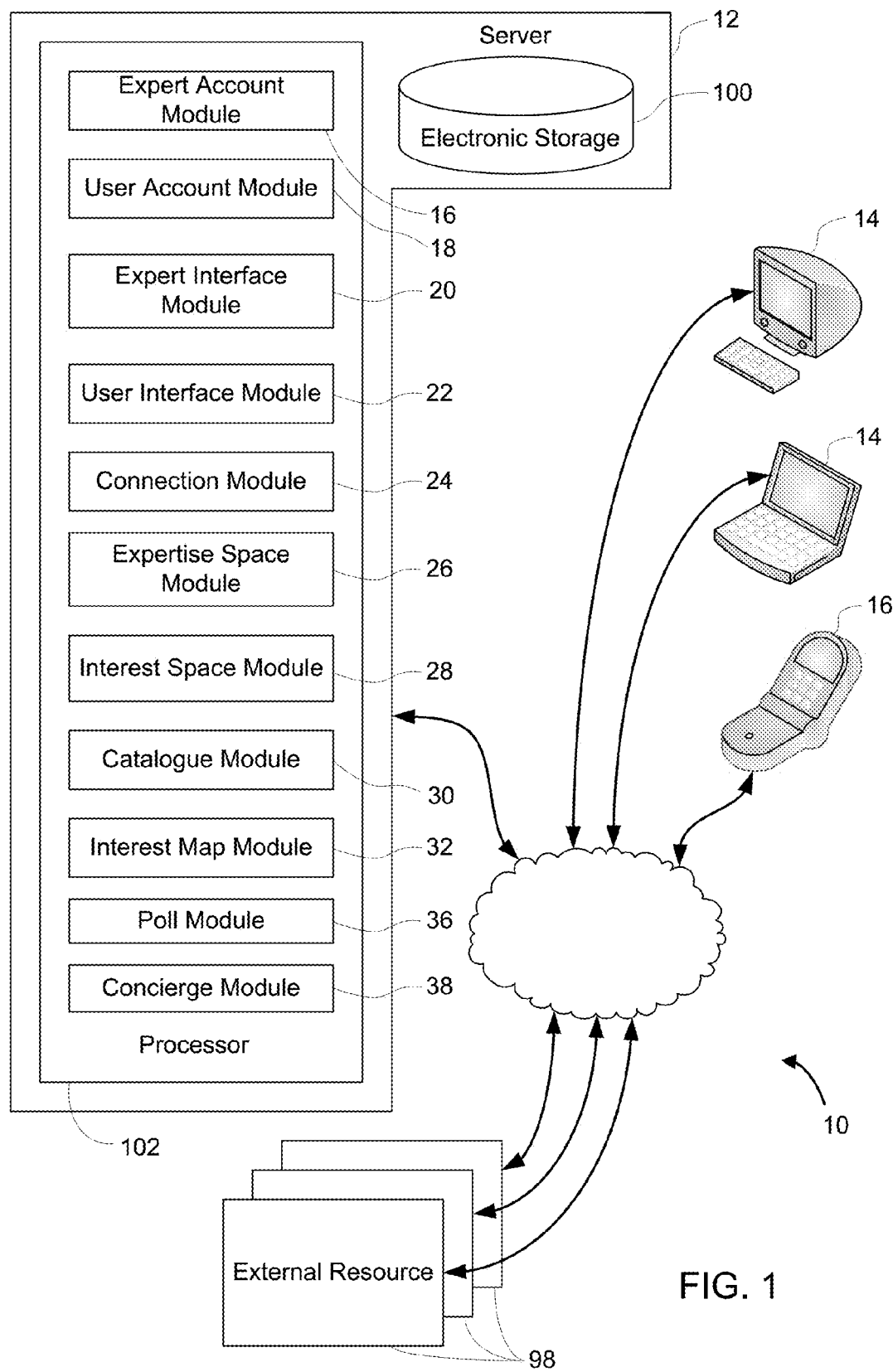
FIG. 1 illustrates a system configured to provide a virtual environment that facilitates education and knowledge gathering by users.

FIG. 1 illustrates a system 10 configured to provide a virtual environment that facilitates education and knowledge gathering by users. The users may include children (<13 years of age), youth (<years of age), and/or other users. The system 10 may facilitate interaction between the users and experts having field-specific expertise. The virtual environment provided by system 10 may include features of one or more of a social networking website, a virtual world, a blogging website, a micro-blogging service, and/or other features of virtual environments. Providing the virtual environment may include hosting the virtual environment over a network. In some implementations, system 10 may include a server 12. The server 12 may be configured to communicate with one or more client computing platforms 14 according to a client/server architecture. The users and/or the experts may access system 10 via client computing platforms 14.

The server 12 may be configured to execute one or more computer program modules. The computer program modules may include one or more of an expert account module 16, a user account module 18, an expert interface module 20, a user interface module 22, a connection module 24, an expertise space module 26, an interest space module 28, a catalogue module 30, an interest map module 32, a poll module 36, a concierge module 38, and/or other modules.

The expert account module 16 may be configured to manage expert accounts that correspond to individual experts that use system 10. The expert accounts may include expert information pertaining to the corresponding experts. The expert information pertaining to a given expert may include one or more of a name (e.g., first and last name, legal name, and/or other real world names), login information, real world contact information (e.g., email, phone, street address, and/or other information), credential information, experience information, area(s) of expertise, group membership within system 10, connections with users and/or other experts within system 10, usage information related to usage of system 10, and/or other information. The expert information may include stated information (e.g., obtained from the given expert directly), analysis of usage of system 10 by the given expert, information obtained from communication by the given expert within system 10, information obtained from users and/or other experts, and/or other information. Some or all of the expert information may be stored to electronic storage that is accessible to and/or associated with server 12.

It will be appreciated that the term "expert" herein does not necessarily refer to an individual that has met some predetermined threshold of experience, training, or skill. Expert may refer to an individual that assumes a roll of advisement and information dissemination with respect to an area of expertise. The experts may have training, experience, and/or skill that provides them with a heightened level of insight with respect to their area of expertise. Experts may be authenticated as such by an administrator of system 10 to interact with the users as sources of information, advice, and/or insight for users. In some implementations, establishment of an expert account may be initiated by an administrator that acts as a gatekeeper for individuals that are enabled to use system 10 as "experts".

The user account module 18 may be configured to manage user accounts that correspond to individual users of system 10. The user accounts may include user information pertaining to the corresponding users. The users information pertaining to a given user may include one or more of a username (e.g., a handle, an account number or identifier, and/or other user identifiers), login information, interest information, area(s) of interest, group membership within system 10, connections with other users and/or experts within system 10, usage information related to usage of system 10, and/or other information. The user information may include stated information (e.g., obtained from the given user directly), analysis of usage of system 10 by the given user, information obtained from communication by the given user within system 10, information obtained from other users and/or experts, and/or other information. Some or all of the user information may be stored to electronic storage that is accessible to and/or associated with server 12.

As used herein, a "user" may be an individual that is not an expert. The system 10 may be designed to accommodate use by users that are subject to certain restrictions in using interactive communication systems, such as an Internet web site and/or other virtual environments. Such individuals may include, for example, children, youth, and/or other individuals. The system 10 may be designed to facilitate research of areas of interest, and to provide a medium for secure communications between users and experts with expertise that is of interest to the users.

The expert interface module 20 may be configured to provide an interface to the experts. The interface may include one or more of a web page hosted by server 12, an interface provided via a dedicated client application on client computing platforms 14, and/or other interfaces by which experts can receive from and/or provide information to server 12. Generally, system 10 may operate to provide a platform by which an expert can communicate with users of system 10. The system 10 may facilitate communication between experts. Communications between a given expert, and one or more users and/or one or more other experts may include one-to-one communication, group communication, one-to-many communication, private communications, public communications, and/or other communication. The expert interface provided by expert interface module 20 may be configured to present such communications to the experts, and to facilitate management of communication by the experts.

By way of non-limiting example, the expert interface provided to a given expert may organize communications within one or more mailboxes. The one or more mailboxes may include one or more of an inbox, a drafts mailbox, a sent mailbox, one or more custom mailboxes or folders in which communications are stored, and/or other mailboxes. The expert interface may include a field configured to receive entry and/or selection from the given expert for composition of a new communication (e.g., a new message). Responsive to such a selection and/or entry, expert interface module 20 may be configured such that the expert interface presents fields to the given expert for entry and/or selection of one or more of at least one recipient, content, a subject, and/or other information included in the communication. The expert interface may include a field configured to receive entry and/or selection from the expert for transmission of the communication to the appropriate recipients. Responsive to such an entry and/or selection, server 12 may be configured to transmit the communication to the appropriate recipients. These communications may include private messages. The expert interface facilitating such communications by the expert may be configured with features similar to or the same as known email interfaces. This may enhance the ease of use for experts familiar with communicating through media such as email.

As an example, the expert interface provided to a given expert may include a blogging interface configured to facilitate creation and management of a blog by the given expert. To this end, the expert interface may include a field for entry and/or selection of content to be included in blog posts, a field for entry and/or selection of tags indicating topical themes of a blog post, a field for entry and/or selection of a command to publish a created blog post, and/or other fields. This portion of the expert interface may include one or more features in common with known blog creation tools. This may enhance the ease of use for experts familiar with maintaining a blog.

As an example, expert interface module 20 may be configured such that the expert interface provided to a given expert may include a profile management interface configured to receive entry and/or selection of profile information related to the given expert. The profile information may include one or more of area(s) of expertise, credential information, experience information, content (e.g., images, video, audio, text, and/or other content) and/or other information.

Figure 2:
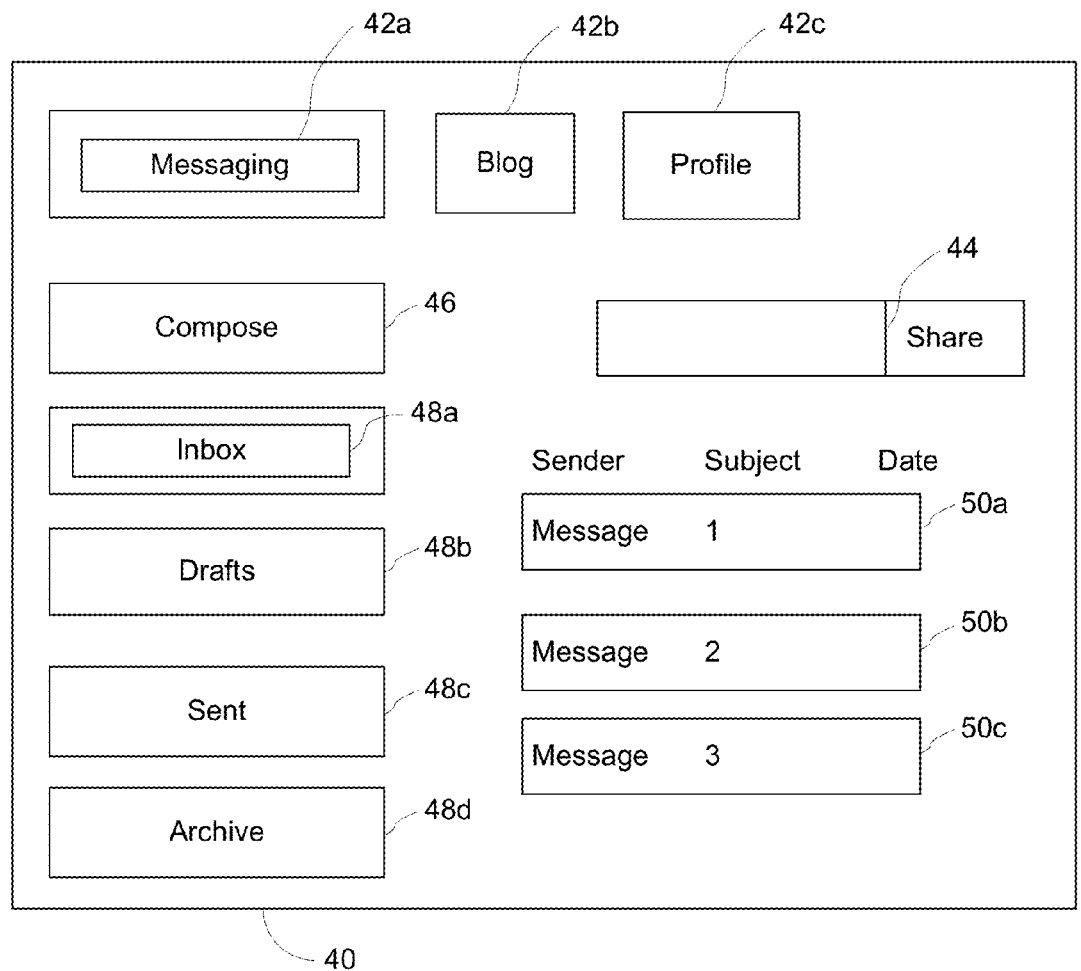
FIG. 2 illustrates an expert interface facilitating interaction with a virtual environment by an expert.

By way of illustration, FIG. 2 depicts an expert interface 40 configured to provide information to and receive information from a system that is the same as or similar to system 10 (shown in FIG. 1 and described herein). As can be seen herein, expert interface 40 may include one or more of at least one interface selection field 42 (illustrated in FIG. 2 as fields 42*a*, 42*b*, and 42*c*), a share field 44, a compose field 46, at least one mailbox selection field 48 (illustrated in FIG. 2 as fields 48*a*, 48*b*, 48*c*, and 48*d*), at least one message field 50 (illustrated in FIG. 2 as fields 50*a*, 50*b*, and 50*c*).

The interface selection fields 42 may be configured to receive entry and/or selection from an expert of functionality to be provided to the expert through expert interface 40. For example, interface selection fields 42 may include one or more of an expert messaging interface field 42*a*, an expert blog interface field 42*b*, an expert profile interface field 42*c*, and/or other fields. Selection of expert messaging interface field 42*a* may result in the presentation of messaging functionality within expert interface 40, as illustrated in FIG. 2. Selection of expert blog interface field 42*b* may result in the presentation through expert interface 40 of functionality associated with managing an expert blog. Selection of expert profile interface field 42*c* may result in the presentation through expert interface 40 of functionality associated with managing an expert profile.

Share field 44 may be configured to receive entry and/or selection by the expert of content to be shared with users. Entry and/or selection by the expert of content to share field 44 may result in the entered and/or selected content being provided to users within the virtual environment. The users that receive the shared content may include users linked to the expert, users with interests associated with the area(s) of expertise of the expert, users that have joined groups of which the expert is a member, and/or other users.

Responsive to selection of compose field 46, expert interface 40 may present, to the expert, fields for creating a message and indicating which user(s) and/or expert(s) the message should be sent to within the virtual environment. These fields may be similar to or the same as the fields associated with known email composition interfaces. In some implementations, the expert may only be able to generate messages to users with which communication has previously been initiated by the user. In other words, while communication with users through messages created through expert interface 40 may be two-way between expert and user, initiating such communication in the first instance may only be accomplished by a user.

Responsive to one of mailbox selection fields 48, messages associated with the selected mailbox may be presented to the expert within expert interface 40. For example, responsive to selection of inbox selection field 48*a*, messages in an inbox (or message fields associated therewith) may be presented in expert interface 40.

Message fields 50 may represent messages in a selected mailbox. Responsive to selection of a given one of message fields 50, the corresponding message may be presented to the expert within expert interface 40.

It will be appreciated that the description of fields 42, 44, 46, 48, and 50 within expert interface 40 is not intended to be limiting. The expert interface 40 may include more or less fields configured to receive entry and/or selection from the expert.

Returning to FIG. 1, expert interface module 20 may be configured to provide "external" interfaces that represent experts within the virtual environment to other experts and/or users. The expert external interfaces may include web pages hosted by server 12, interfaces provided via a dedicated client application on client computing platforms 14, and/or other interfaces by which experts are represented to other experts and/or users of system 10. In some implementations, an expert external interface representing a given expert may include one or more of a name (e.g., first and last name, legal name, and/or other real world names), area(s) of expertise, content associated with the given expert (e.g., image(s), video, audio, text, and/or other content), and/or other information. The expert external interface for the given expert may include a mechanism for contacting the given expert, access to a blog or other content managed or associated with the given expert, a field for receiving entry and/or selection of a request to form a link with the given expert, and/or other information or functionality. The expert external interface may be configured to appear as a business card having one or two sides.

Figure 3:
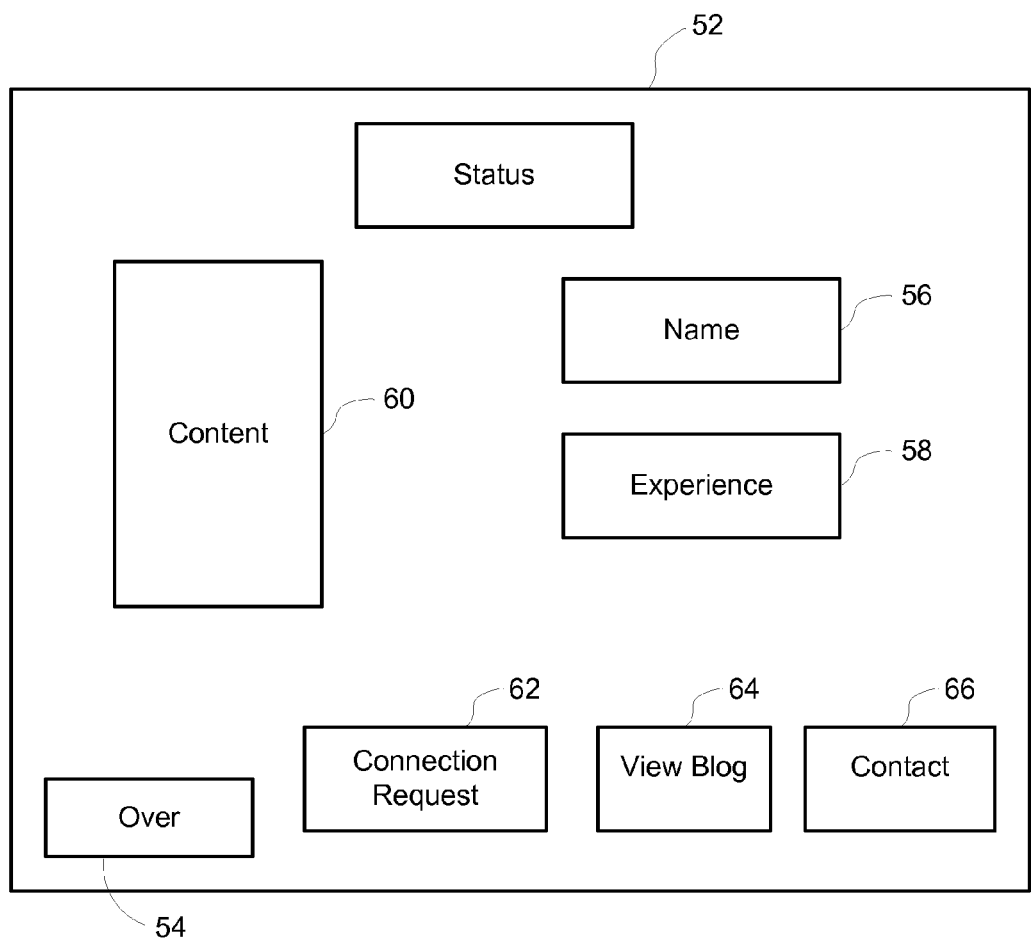
FIG. 3 illustrates an external expert interface representing an expert in a virtual environment.
Figure 4:
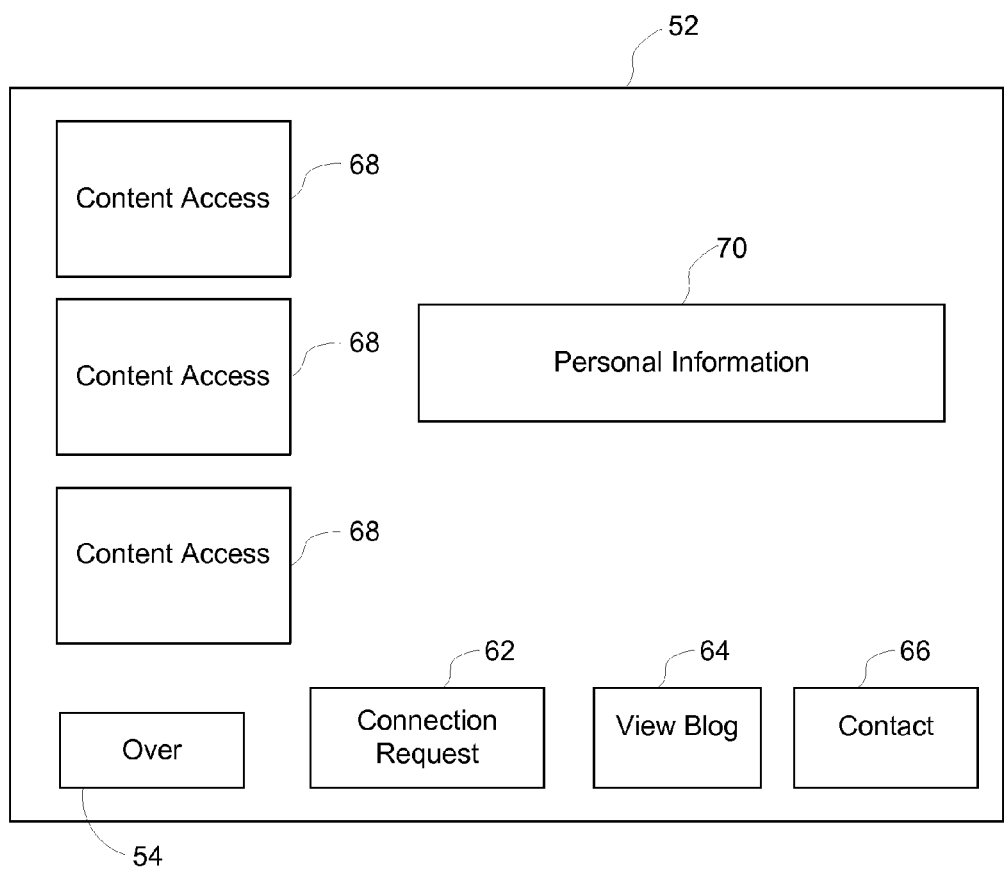
FIG. 4 illustrates an external expert interface representing an expert in a virtual environment.

By way of illustration, FIGS. 3 and 4 depict an expert external interface 52 configured to appear as a business card. The expert external interface 52 may be provided by a system 10 similar to or the same as system 10 (shown in FIG. 1 and described herein). The business card may have two sides, with FIG. 3 depicting the "front" side of expert external interface 52, and FIG. 4 depicting the "back" side of expert external interface 52. The expert external interface 52 may include a switch field 54 configured to receive selection by a user or expert to effect switching of expert external interface 52 between the front view shown in FIG. 3 and the back view shown in FIG. 4.

As can be seen in FIGS. 3 and 4, expert external interface 52 may include one or more of a name field 56, an experience field 58, a content field 60, a connection request field 62, a blog access field 64, a contact field 66, a content access field 68, a personal information field 70, and/or other fields. The name field 56 is configured to display the name of the given expert. The name displayed may be a real world name by which the given expert is known in everyday life (e.g., first and last name, legal name, and/or other names). The experience field 58 may be configured to display experience information and/or credential information for the given expert. Such information may include, without limitation, job title, job description, education and certification, and/or other information. The content field 60 may include content associated with the given expert. Such content may include, for example, an image of the expert, a status post, and/or other content. The connection request field 62 may be configured to receive a selection from a user indicating that the user would like to form a connection with the given expert. The blog access field 64 may be configured to receive a selection from a user or expert indicating that the user or the other expert would like to access a blog maintained by the given expert. Reception of such a selection may result in the requested blog being provided to the user or other expert. The contact field 66 may be configured to receive a selection from a user or other expert indicating the user or other expert would like to contact the given expert. Reception of such a selection may result in an interface being presented to the user or other expert by which a communication to the given expert can be generated. The content access field 68 may include links to content associated with the given expert. The content may include still images, video, audio, text, and/or other content. The personal information field 70 may include personal information related to the given expert. The personal information may include a personal quote, and/or other personal information. One or more of fields 56, 58, 60, 62, 64, 66, 68, and/or 70 may be populated automatically from information included in the profile of the given expert.

Returning to FIG. 1, user interface module 22 may be configured to provide an interface to the users. The interface may include one or more of a web page hosted by server 12, an interface provided via a dedicated client application on client computing platforms 14, and/or other interfaces by which user can receive from and/or provide information to server 12. Generally, system 10 may operate to provide a platform by which a user can accomplish one or more of connect with and/or communicate with experts, connect with and/or communicate with other users, express themselves, be introduced to previously undiscovered area(s) of interest, research area(s) of interest, and/or other tasks. To these and/or other ends, the user interface corresponding to a given user may provide with mechanisms by which these objectives may be accomplished. The user interface may include information added or edited directly by the given user, information indicative of the given user's communications (and/or communications directed to the given user), selections, and/or interactions on system 10, and/or other information.

In some implementations, the user interface may include some or all of the features commonly associated with a user's wall on a social networking web site. These may include, for example, one or more of posts by other users; status updates by the given user; links to content; users; or experts by the given user; status updates from other users (e.g., friends), experts (e.g., linked experts), and/or groups joined by the given user; links to content forwarded from other users (e.g., friends), experts (e.g., linked experts), and/or groups joined by the given user; comments on posts of text and/or content by the given user, other users (e.g., friends), and/or experts (e.g., linked experts); profile information; area(s) of interest; and/or other information.

Communications between a user and an expert may be presented to the user and the expert differently. This may be due in part to the differences between the expert interface provided by expert interface module 20 and the user interface provided by user interface module 22. As has been set forth, communications may be presented to the expert in the format of a known email interface as separate messages, and/or message threads. Communications may be presented to the user in the format of a known social networking website. For example, the communications may be presented to the user in a feed of the user interface that includes the communications and some or all of the other types of information listed above. This may provide adult experts with a communication experience they are familiar and comfortable with, and may provide child or youth users with a communication experience that mimics the more immersive social network format. This may enhance usability for one or both groups.

The connection module 24 may be configured to manage connections between users and/or experts. Generally, in conventional social networking web sites, these connections may be referred to as "friends". Acceptance of a connection by a first user for a second user may provide access for the second user to various information included in the user interface for the first user, may result in information entered to system 10 by the second user appearing on the user interface for the first user (e.g., in the feed of the first user), may enable the first user to post information and/or content to the user interface for the second user, and/or may have other results. These results may be reciprocal between the second user and the first user as well. The connection module 24 may be configured manage the permissions for these and/or other functions within system 10 based on accepted connections between users and/or experts. The connection module 24 may be configured to present to users and/or experts fields in user interfaces configured to receive selection or entry of connection requests, acceptance of connection requests, denial of connections requests, and/or other functionality related to connections.

The connection module 24 may be configured such that the connections between users and/or experts include two or more separate types of connections. These types of connections may include a first type of connection between a user and an expert, a second type of connection between two users, and/or other types of connections. The first type of connection may be referred to herein as a "link" between the user and the expert. The second type of connection may be referred to herein as a "friend" connection between the two users. In some implementations, connection module 24 is configured such that a friend connection can be initiated (e.g., with a request) by either of the two users. The connection module 24 may be configured such that a link connection can only be initiated by the user (e.g., with a request), and not by the expert. A friend connection and/or an expert connection may be ended by either party involved (e.g., whether friend or expert).

The connection module 24 may be configured such that the formation of friend connections differs from the formation of friend connections in conventional connections in social networking web sites in one or more of a variety of manners. For example, connection module 24 may be configured such that within system 10 users may not be aware of the real world names of each other. At least they may not be informed of the real world identities of other users within the interfaces provided by system 10. The connection module 24 may be configured such that friend connection information for a given user (e.g., with whom the given user is connected as a friend) may not be provided to other users or experts. Not even those users or experts with which the user is connected as a friend. One or both of these features may reduce the emphasis on users connecting with real world and/or common friends. One or both of these features may enhance friend connections being spontaneously established between users that have common interests and/or usage patterns.

Connections, whether link or friend, may be requested by a user through selection of an appropriate field in a user interface presented by system 10. Responsive to selection of such a reception, connection module 24 may generate a connection request to a target (e.g., a user or expert). The connection request may include a username of the requesting user, information related to the requesting user, and/or other information. The connection request may be presented to the target via an interface provided by connection module 24. The interface may include a web page hosted by server 12, a view of a dedicated client application, and/or other interfaces. The connection request may include an acceptance field, a denial field, and/or other fields. The acceptance field may be configured to receive selection and/or entry of an acceptance of the connection request. The denial field may be configured to receive selection and/or entry of a denial of the connection request. Responsive to reception of an acceptance, connection module 24 may establish the requested connection between the requesting user and the target. Responsive to reception of a denial, connection module 24 may not establish the requested connection.

The expertise space module 26 may be configured to provide spaces within the virtual environment devoted to individual areas of expertise of the experts. A space within the virtual environment may include one or more web pages hosted by server 12, a virtual space hosted by server 12, and/or other spaces. An area of expertise may include a broad category of expertise. An area of expertise may include a plurality of sub-categories. The sub-categories may include topical sub-categories, sets of occupations, and/or other sub-categories. By way of non-limiting example, an area of interest may include technology and engineering. The sub-categories of such an area of interest may include one or more of scuba diver, architect, auto mechanic, cybercrime product manager, energy investment specialist, information technology worker, and/or other sub-categories. The sub-categories within an individual area of expertise may be included one or more other areas of interest as well. For example, the sub-category "architect" could also be included within an art and design area of interest.

The accounts managed by expert account module 16 may include assignments of individual experts to sub-categories. These assignments may be created by the experts themselves (e.g., through input), by an administrator, and/or determined automatically based on expert profile information. A space provided by expertise space module 26 for a given area of expertise may include a listing of the sub-categories included in the given area of expertise. The space may be configured to receive selection by a user or expert of a sub-category. Responsive to such a selection, expertise space module 26 may be configured to present to the selecting user or expert additional information about the selected sub-category. The additional information may include, for example, one or more of a listing of experts having expertise in the sub-category, access to reference materials related to the selected sub-category, news sources related to the selected sub-category, and/or other information.

The interest space module 28 may be configured to provide spaces within the virtual environment devoted to individual areas of interest of the users. An area of interest may include a broad category of interest. Individual ones of the areas of interest may overlap with and/or correspond to individual ones of the areas of expertise. The space for a given area of interest may include indicia representing individual experts having area(s) of expertise that correspond to or overlap with the given area of interest, indicia representing individual users that have indicated an affinity for the given area of interest, content associated with the given area of interest, links to external information resources relevant to the given area of interest, and/or other information. The interest space module 28 may be configured to dynamically obtain some or all of the information included in the space for the given area of interest. This may be accomplished by automatically populating the space with users, experts, content, and/or other information within system 10 indicated as being relevant to, associated with, and/or related to the given area of interest.

Figure 5:
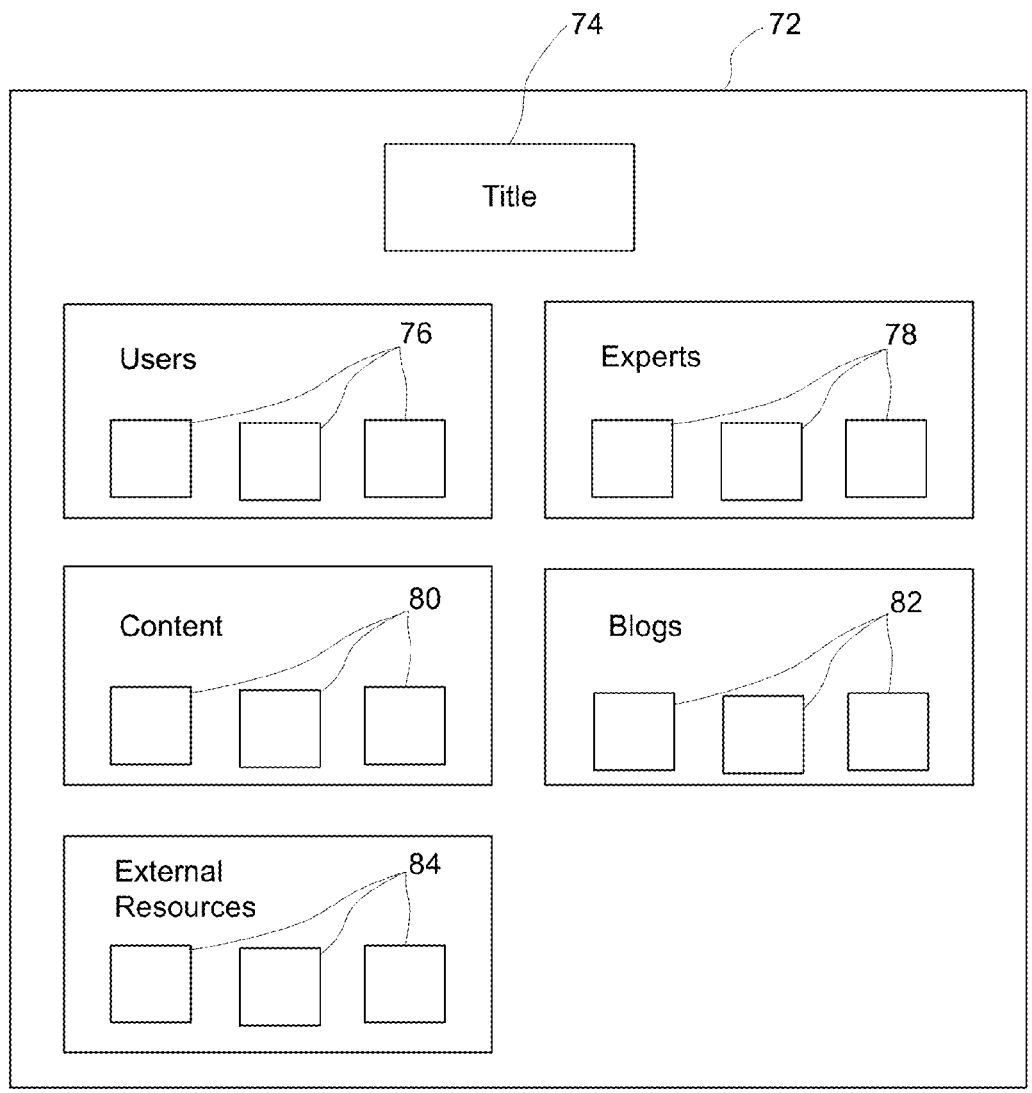
FIG. 5 illustrates a space in a virtual environment associated with an area of interest.

By way of illustration, FIG. 5 depicts an interface 72 that presents a space associated with a given area of interest. The interface may be generated and/or provided by a system similar to or the same as system 10 (shown in FIG. 1 and described herein). As can be seen in FIG. 5, interface 72 may include one or more of a title field 74, user fields 76, expert fields 78, content fields 80, blog fields 82, external resource fields 84, and/or other fields. The title field 74 may be configured to present the title of the given area of interest. The user fields 76 may be configured to present users that have an affinity to the given area of interest. The user fields 76 may be selectable to obtain more information related to the users (e.g., access the user interface associated with a selected user), communicate with the users, and/or otherwise access the users or information related thereto. The expert fields 78 may be configured to present experts with areas of expertise that overlap with and/or correspond to the given area of interest. The expert fields 78 may be selectable to obtain more information related to the experts, communicate with the experts, and/or otherwise access the experts or information related thereto. The content fields 80 may be configured to present content (e.g., images, video, audio, text, and/or other content) related to the given area of interest. The content fields 80 may present the actual content and/or be selectable by users or experts for access to the content. The blog fields 82 may be configured to present blogs (e.g., blogs on system 10 maintained by experts) relevant or related to the given area of interest. The blog fields 82 may be selectable to obtain further access to the blogs (e.g., through links). The external resource fields 84 may represent external resources relevant or related to the given area of interest. For example, external resource fields 84 may include selectable links to external resources available over the network.

Returning to FIG. 1, catalogue module 30 may be configured to catalogue and/or rank areas of interest for individual users. This may include providing a user interface whereby individual users can select areas of interest for inclusion in their catalogue. The user interface may be configured to receive selections from users indicating a hierarchy of preference and/or priority for areas of interest. The inclusion of areas interest in a catalogue of a given user, and/or the ranking of the areas of interest by the given user may provide information usable by system 10 to push content, information, other users, experts, and/or other features or functions to the given user. The catalogue provided by catalogue module 30 for the given user may provide the given user with a forum to discover, explore, and/or prioritize her interests.

Figure 6:
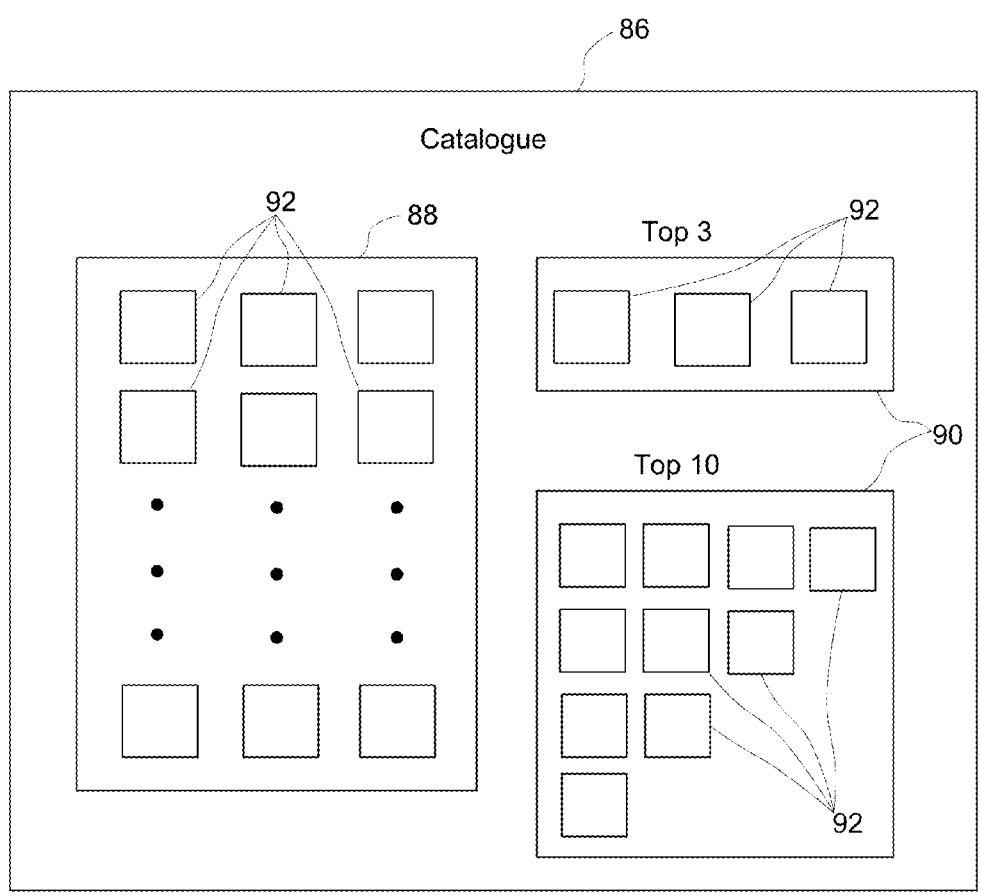
FIG. 6 illustrates a user interface configured to facilitate cataloguing and/or ranking areas of interest by a user.

By way of illustration, FIG. 6 depicts a catalogue user interface 86 configured to catalogue and/or range areas of interest for a given user. The catalogue user interface 86 may be provided by a system similar to or the same as system 10 (shown in FIG. 1 and described herein). As can be seen in FIG. 6, catalogue user interface 86 may include a catalogue field 88, one or more ranking fields 90, and/or other fields. The catalogue field 88 may be configured to present selected areas of interest 92. The areas of interest 92 may be selected by the given user in one or more other user interfaces provided by the system. For example, the areas of interest 92 may be selected from an area of interest space (e.g., as provided by interest space module 28 shown in FIG. 1), from a listing of areas of interest in the user interface associated with another user (e.g., from the other user's wall), from a user interface associated with an expert, and/or other interfaces provided by the system. The areas of interest 92 may include broad areas of interest and/or sub-categories that fall within one or more broader areas of interest.

The ranking fields 90 may be configured to receive entry and/or selection from the given user indicating relative rankings of the areas of interest 92. The relative rankings may include an ordered ranking system in which the individual areas of interest 92 are ordered from least to most important (or vice versa). The relative rankings may include a level scheme in which groups of areas of interest 92 are included in groups based on importance. For example, in the exemplary illustration of catalogue user interface 86 shown in FIG. 6, ranking fields 90 may include a first group 94 made up of the top three areas of interest 92, a second group 96 made up of the top 10 areas of interest 92, and/or other groups.

Returning to FIG. 1, interest map module 32 may be configured to generate interest maps that graphically represent the interests of users. The interest map generated for a given user may be presented to the given user, included in the user interface corresponding to the given user (e.g., on the wall of the given user), and/or presented via other media. The interest maps may provide the users with a snapshot of their current interests, passions, plans and dreams. The interest maps of the user may evolve over time as the interests of the users change and evolve. In order to generate the interest maps, interest map module 32 may be configured to obtain information about the subjective importance or interest of individual areas of interest to the users. Such information may be obtained by presenting a user interface to the users that request entry of subjective importance of individual areas of interest, from rankings of areas of interest in the catalogues maintained by catalogue module 30, based on usage patterns of the users (e.g., time spent in area of interest and/or area of expertise spaces, amount of communication with experts, amount of communication with other users, and/or other usage parameters), and/or from other sources.

The poll module 36 may be configured to present polls to users in the virtual environment. The polls may include one or more questions. Poll questions may be designed to expose users to different areas of interest, expertise and/or occupations, to get users to view areas of interest, expertise, and/or occupations in a different way, to learn about the individual users, and/or for other purposes. The poll questions may not be designed with right and wrong answers, but may be designed to elicit a point of view from the users. The poll module 36 may be configured to present the poll questions to users via the feeds in their user interfaces (e.g., through the news feeds on their walls).

The concierge module 38 may be configured to push content, network links, experts, blogs, blog posts, and/or other information to users. The concierge module 38 may provide the information to the users in the feed of their user interfaces (e.g., the feed of the users' walls). The information pushed to a given user may be determined by concierge module 38 based on the areas of interest included in the catalogue for the given user, the ranking of the areas of interest in the catalogue by the given user, the subjective importance of areas of interest in the interest map of the given user, the friend and/or link connections of the given user, groups the given user has joined, answers to poll questions, and/or other parameters of user usage and/or interest.

The server 12, client computing platforms 14, and/or external resources 98 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, client computing platforms 14, and/or external resources 98 may be operatively linked via some other communication media.

A given client computing platform 14 may include one or more processors configured to execute computer program modules. The computer program modules may be configured to enable an expert or user associated with the given client computing platform 14 to interface with system 10 and/or external resources 98, and/or provide other functionality attributed herein to client computing platforms 14. By way of non-limiting example, the given client computing platform 14 may include one or more of a desktop computer, a laptop computer, a handheld computer, a NetBook, a Smartphone, a gaming console, and/or other computing platforms.

The external resources 98 may include sources of information, hosts and/or providers of virtual environments outside of system 10, external entities participating with system 10, and/or other resources. In some implementations, some or all of the functionality attributed herein to external resources 14 may be provided by resources included in system 10.

The server 12 may include electronic storage 100, one or more processors 102, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 100 may comprise electronic storage media that electronically stores information. The electronic storage media of electronic storage 100 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 100 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 100 may include one or more virtual storage resources (e.g., cloud storage, a virtual private network, and/or other virtual storage resources). Electronic storage 100 may store software algorithms, information determined by processor 102, information received from server 12, information received from client computing platforms 14, and/or other information that enables server 12 to function properly.

Processor(s) 102 is configured to provide information processing capabilities in server 12. As such, processor 102 may include one or more of a digital processor, an analog processor, a digital circuit designed to process information, an analog circuit designed to process information, a state machine, and/or other mechanisms for electronically processing information. Although processor 102 is shown in FIG. 1 as a single entity, this is for illustrative purposes only. In some implementations, processor 102 may include a plurality of processing units. These processing units may be physically located within the same device, or processor 102 may represent processing functionality of a plurality of devices operating in coordination. The processor 102 may be configured to execute modules 16, 18, 20, 22, 24, 26, 28, 30, 32, 36, and/or 38. Processor 102 may be configured to execute modules 16, 18, 20, 22, 24, 26, 28, 30, 32, 36, and/or 38 by software; hardware; firmware; some combination of software, hardware, and/or firmware; and/or other mechanisms for configuring processing capabilities on processor 102.

It should be appreciated that although modules 16, 18, 20, 22, 24, 26, 28, 30, 32, 36, and/or 38 are illustrated in FIG. 1 as being co-located within a single processing unit, in implementations in which processor 102 includes multiple processing units, one or more of modules 16, 18, 20, 22, 24, 26, 28, 30, 32, 36, and/or 38 may be located remotely from the other modules. The description of the functionality provided by the different modules 16, 18, 20, 22, 24, 26, 28, 30, 32, 36, and/or 38 described below is for illustrative purposes, and is not intended to be limiting, as any of modules 16, 18, 20, 22, 24, 26, 28, 30, 32, 36, and/or 38 may provide more or less functionality than is described. For example, one or more of modules 16, 18, 20, 22, 24, 26, 28, 30, 32, 36, and/or 38 may be eliminated, and some or all of its functionality may be provided by other ones of modules 16, 18, 20, 22, 24, 26, 28, 30, 32, 36, and/or 38. As another example, processor 102 may be configured to execute one or more additional modules that may perform some or all of the functionality attributed below to one of modules 16, 18, 20, 22, 24, 26, 28, 30, 32, 36, and/or 38.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to provide a virtual environment to users for facilitating social interactions and education between the users, the system comprising:
one or more hardware processors configured by machine-readable instructions to:
manage accounts for non-expert and expert users of the virtual environment, wherein the accounts comprise a first account type for expert users and a second account type for non-expert users, a given expert user being described as having a field-specific expertise;
provide spaces within the virtual environment, wherein each space is associated with its own field-specific expertise, the spaces comprising at least a first space associated with a first field-specific expertise;
assign a first expert user, designated to have the first field-specific expertise, to the first space;
provide a selectable listing of expert users, including the first expert user, assigned to the first space;
receive, from a first non-expert user, a selection of the first expert user from among the selectable listing;
provide information that describes the first expert user responsive to the selection, wherein the information is configured to provide information to the first non-expert user to decide on whether to request to be connected with the first expert user;
receive, from the first non-expert user, a request to establish a first type of connection between the first expert user and the first non-expert user;
establish the first type of connection between the first expert user and the first non-expert user based on the request;
provide interfaces of a first interface type for presentation to expert users, a first interface of the first interface type facilitating access by the first expert user to first information including a first string of one or more educational messages between the first expert user and the first non-expert user within the virtual environment in a mailbox format, wherein the one or more educational messages includes at least a first educational message from the first expert user to at least the first non-expert user;
receive, via the first interface of the first interface type, the first educational message in the mailbox format;
generate at least a first wall item based on the first educational message;
obtain content, associated with the first non-expert user, in a format other than the mailbox format;
generate at least a second wall item based on the content; and
provide interfaces of a second interface type for presentation to the non-expert users, a first interface of the second interface type presenting to the first non-expert user the same first information accessible to the first expert user but in a user wall format, the user wall format including a presentation of a feed of wall items displayed in chronological order, wherein the feed of wall items includes at least the first wall item and the second wall item.

2. The system of claim 1, wherein the one or more hardware processors are further configured by machine-readable instructions such that the first interface of the first interface type in the mailbox format presented to the first expert user includes a presentation of a list of communications between the first expert user and one or more non-expert users of the virtual environment comprising a first communication and a second communication, wherein an entry in the list corresponding to the first communication includes a subject line for the first communication and a sender of the first communication, and is selectable by the first expert user to view the first communication.

3. The system of claim 2, wherein the one or more hardware processors are further configured by machine-readable instructions such that the first interface of the first interface type having the mailbox format is viewable only by the first expert user.

4. The system of claim 1, wherein the one or more hardware processors are further configured by machine-readable instructions such that the wall items in the interface presented to the first non-expert user comprise two or more of a notification of an activity of a second non-expert user that has established connections with the first non-expert user, a communication to the first non-expert user from a third non-expert user, or a virtual gift from a fourth non-expert user.

5. The system of claim 4, wherein the one or more hardware processors are further configured by machine-readable instructions such that the first interface of the second interface type having the user wall format is viewable to other non-expert users that have established connections with the first non-expert user in the virtual environment.

6. The system of claim 1, wherein the one or more hardware processors are further configured by machine-readable instructions to manage connections between pairs of users of the virtual environment, such connections enabling interactions between the pairs of users within the virtual environment such that connections between pairs of users include the first type of connection, and a second type of connection for pairs of users, and wherein the first type of connection provides educational interaction functionality between a connected pair including an expert user and a non-expert user, the second type of connection provides social interaction functionality between a connected pair of users.

7. The system of claim 6, wherein the one or more hardware processors are further configured by machine-readable instructions such that the first type of connection can be requested only by the non-expert users to connect with the expert users, and cannot be initiated by the expert users to connect with the non-expert users.

8. The system of claim 6, wherein the one or more hardware processors are further configured by machine-readable instructions such that a connection of the first type of connection between the first expert user and the first non-expert user does not provide access for the first expert user to other non-expert users with which the first non-expert user has established connections.

9. The system of claim 6, wherein the one or more hardware processors are further configured by machine-readable instructions such that the second type of connection does not provide access for any other non-expert users to access a connection of the second type of connection.

10. The system of claim 1, wherein the one or more hardware processors are further configured by machine-readable instructions to:
receive, via the first interface of the second interface type, a message, from the first non-expert user, directed to the first expert user;
generate at least a first electronic mail item based on the message from the first non-expert user; and
provide the first electronic mail item via the first user interface of the first interface type to the first expert user.

11. The system of claim 10, wherein the one or more hardware processors are further configured by machine-readable instructions to:
- generate a third wall item based on the message from the first non-expert user; and
- post the third wall item to the feed of wall items in the chronological order.

12. The system of claim 1, wherein the one or more hardware processors are further configured by machine-readable instructions to:
- obtain one or more interests of the first non-expert user; and
- provide the one or more interests via the first interface of the first interface type.

13. The system of claim 12, wherein to provide the one or more interests, the one or more hardware processors are further configured by machine-readable instructions to:
- generate at least one wall item based on the one or more interests; and
- post the at least one wall item to the feed of wall items.

14. The system of claim 12, wherein to obtain the one or more interests, the one or more hardware processors are further configured by machine-readable instructions to:
- determine usage patterns of the first non-expert user with respect to the system; and
- determine the one or more interests based on the monitored user activity.

15. The system of claim 12, wherein the one or more hardware processors are further configured by machine-readable instructions to:
- generate a catalog of user interests for the first non-expert user, wherein the catalog includes the one or more interests;
- receive an indication of at least one user interest from the first non-expert user; and
- add the at least one user interest to the catalog.

16. The system of claim 15, wherein the one or more hardware processors are further configured by machine-readable instructions to:
- identify second content based on the catalog; and
- provide the identified second content to the first non-expert user.

17. The system of claim 16, wherein to identify the second content, the one or more hardware processors are further configured by machine-readable instructions to:
- identify one or more expert users with whom to connect based on the catalog.

18. The system of claim 16, wherein to provide the identified second content, the one or more hardware processors are further configured by machine-readable instructions to:
- generate a third wall item based on the identified second content; and
- post the third wall item to the feed of wall items.

19. The system of claim 12, wherein the one or more interests includes a first interest and a second interest, and wherein the one or more hardware processors are further configured by machine-readable instructions to:
- obtain, from the first non-expert user, an indication of a first level of importance of the first interest;
- obtain, from the first non-expert user, an indication of a second level of importance of the second interest;
- generate, based on the first level of subjective importance and the second level of subjective importance, an interest map that graphically represents at least the first interest and the second interest; and
- provide the interest map via the at least the first interface of the second interface type.

20. The system of claim 12, wherein the one or more hardware processors are further configured by machine-readable instructions to:
- determine, based on an input from the first non-expert user, an adjustment to the first level of importance or the second level of importance;
- generate, based on the adjustment, an updated interest map; and
- provide the updated interest map via the at least the first interface of the second interface type.

* * * * *